US008236889B2

(12) United States Patent
Martin et al.

(10) Patent No.: US 8,236,889 B2
(45) Date of Patent: Aug. 7, 2012

(54) POLYMERIC DEFOAMER ADDITIVE

(75) Inventors: James Martin, Acworth, GA (US);
Robert Wilson, Marietta, GA (US);
Scott Rosencrance, Douglasville, GA (US); David Previs, Acworth, GA (US)

(73) Assignee: Kemira Chemicals, Inc., Atlanta, GA (US)

( * ) Notice: Subject to any disclaimer, the term of this patent is extended or adjusted under 35 U.S.C. 154(b) by 498 days.

(21) Appl. No.: 12/466,637

(22) Filed: May 15, 2009

(65) Prior Publication Data
US 2010/0292380 A1    Nov. 18, 2010

(51) Int. Cl.
C08F 120/04    (2006.01)
C08L 71/02    (2006.01)
(52) U.S. Cl. .................................. 524/556; 524/386
(58) Field of Classification Search .................. 524/386, 524/556
See application file for complete search history.

(56) References Cited

U.S. PATENT DOCUMENTS

| | | | |
|---|---|---|---|
| 2,937,104 A | 5/1960 | Stephan | |
| 3,076,768 A | 2/1963 | Boylan | |
| 3,751,373 A | 8/1973 | Lieberman et al. | |
| 3,935,121 A | 1/1976 | Lieberman et al. | |
| 4,082,691 A | 4/1978 | Berger | |
| 4,107,073 A | 8/1978 | Maciaszek | |
| 4,123,383 A | 10/1978 | Ihde | |
| 4,443,357 A | 4/1984 | Maloney et al. | |
| 4,445,971 A | 5/1984 | Lappi et al. | |
| 4,540,511 A | 9/1985 | McCaffrey et al. | |
| 4,559,162 A * | 12/1985 | Abel et al. | 516/123 |
| 4,664,844 A | 5/1987 | Bergold et al. | |
| 4,769,170 A | 9/1988 | Omori et al. | |
| 4,871,483 A | 10/1989 | Friel et al. | |
| 5,071,591 A | 12/1991 | Sheridan | |
| 5,082,590 A | 1/1992 | Araud | |
| 5,096,617 A | 3/1992 | Ball et al. | |
| 5,152,925 A * | 10/1992 | Furman | 516/116 |
| 5,283,004 A | 2/1994 | Miura | |
| 5,326,499 A | 7/1994 | Wegner et al. | |
| 5,389,299 A | 2/1995 | Hart | |
| 5,523,019 A | 6/1996 | Kim | |
| 5,562,862 A | 10/1996 | Berzansky et al. | |
| 5,599,481 A | 2/1997 | Walger | |
| 5,662,832 A | 9/1997 | Hauenstein et al. | |
| 5,700,351 A | 12/1997 | Schuhmacher et al. | |
| 5,858,279 A | 1/1999 | Lunski et al. | |
| 6,162,325 A | 12/2000 | Raslack et al. | |
| 6,210,526 B1 | 4/2001 | Pohlen | |
| 6,426,379 B1 | 7/2002 | Rudy et al. | |
| 6,590,000 B2 | 7/2003 | Varadaraj | |
| 7,056,870 B2 | 6/2006 | Chapaton et al. | |
| 7,087,674 B2 | 8/2006 | Sarkar et al. | |
| 2004/0157751 A1 | 8/2004 | Chapaton et al. | |
| 2007/0284067 A1 | 12/2007 | Basillio et al. | |

FOREIGN PATENT DOCUMENTS

| | | |
|---|---|---|
| CA | 2131677 | 3/1995 |
| EP | 0531713 | 3/1993 |
| EP | 0705632 | 4/1996 |
| EP | 0989229 | 3/2000 |
| EP | 1057926 | 12/2000 |
| GB | 2 094 330 | 9/1982 |
| JP | 57025489 | 2/1982 |
| JP | 03068401 | 3/1991 |
| JP | 5222686 | 2/2000 |
| JP | 2000129587 | 5/2000 |
| JP | 2001189712 | 7/2000 |
| JP | 2000246010 | 9/2000 |
| JP | 2002327384 | 11/2002 |
| JP | 3659605 | 6/2005 |
| JP | 2007253014 | 4/2007 |
| JP | 2004238777 | 9/2008 |
| WO | WO2007081921 | 7/2007 |

OTHER PUBLICATIONS

The International Search Report and Written Opinion for PCT/US2010/033827 mailed Feb. 16, 2011.
L.H. Allen et al., "Evidence That Oil-Based Additives Are An Indirect Source of the TCDD and TCDF Produced in Kraft Bleach Plants", Chemosphere, vol. 19, Nos. 1-6, pp. 741-744 (1989).
G.M., Dorris et al., "Analysis of Amide Defoamers in Kraft Mill Pitch Deposits", J. Pulp Paper Science, vol. 11, No. 5, pp. 2-7 (1985).
Luo, Qi et al., "Foam Control Using foaming agent spray: a novel concept for flotation deinking of waste paper", TAPPI Fall Technical Conference: Engineering, Pulping & PCE&I, Chicago, IL., Oct. 26-30, 2003, pp. 811-812 (Abstract).
Li, Xiao-Rui et al., "Preparation of silicone/polyether composite emulsion defoamer", College of Chemistry and Chemical Engineering, vol. 18(6), pp. 18-20 (2004).—English Translation Not Available.
DeLozier, Greg et al., "Surfactant spray flotation deinking of 100% flexographic ONP furnish in the presence of conventional defoamer", School of Chemical and Biomolecular Engineering, Progress in Paper Recycling, vol. 13(1), pp. 5-11 (2003).
DeLozier, Greg et al., "Enhanced flotation deinking of 100% flexographic ONP using surfactant spray technique in the presence of siloxzne-based defoamer", Institute of Paper Science and Technology, Appita Annual Conference and Exhibition (57th), pp. 281-289 (2003).
Luo, Qi et al., "Foam control using a foaming agent spray: a novel concept for flotation deinking of waste paper", Industrial & Engineering Chemistry Research, vol. 42(15), pp. 3578-3583 (2003).
Luo, James et al., "Effects of Deinking Surfactants on Subsequent Processing Chemistry and Paper Machine Runnability", Pulp Conference, Seattle, WA, Nov. 4-7, 2001, pp. 642-667.

(Continued)

Primary Examiner — Satya Sastri
(74) Attorney, Agent, or Firm — Duane Morris LLP

(57) ABSTRACT

The present invention relates to a cost-effective and environmentally friendly polymeric defoamer formulation for use in various industrial applications that does not contain oil, EBS or free silicone.

32 Claims, No Drawings

OTHER PUBLICATIONS

"Foam Down FG, Food-Grade, Kosher, Non-Silicone defoamer", Product and Regulatory Information.
"Defoamer Products", http://www.defoamer.com/home.htm, Apr. 20, 2009.
"Plant Letdown", http://www.defoamer.com/paintletdown.html, Apr. 20, 2009.
"Paint Grind", http://www.defoamer.com/paint_grind.html, Apr. 20, 2009.
"Building materials: mud, grout, drywall", http://www.defoamer.com/building_materials.html, Apr. 20, 2009.
"Concrete: dry & wet defoamers", http://www.defoamer.com/concrete.html, Apr. 20, 2009.
"Inks", http://www.defoamer.com/inks.html, Apr. 20, 2009.
"Metal Working", http://www.defoamer.com/metal_working.html, Apr. 20, 2009.
"Pharmaceuticals", http://www.defoamer.com/pharmaceuticals.html, Apr. 20, 2009.
"Cleaning", http://www.defoamer.com/cleaning.html, Apr. 20, 2009.
"Cosmetics", http://www.defoamer.com/cosmetics.html, Apr. 20, 2009.
"Food", http://www.defoamer.com/food.html, Apr. 20, 2009.
"Waste Management", http://www.defoamer.com/waste_management.html, Apr. 20, 2009.
"DEFOAMER—Oil and Gas Drilling Products from Aqua Clear", http://www.aquaclear-inc.com/non-foaming-products/Defoamer.html, p. 1-2, Apr. 20, 2009.
"WaterSolve, LLC Clearly Thinking About Your Water Treatment, Defoamers & Antifoam Agents", http://www.gowatersolve.com/water_treatment_products/defoamers_antifoam_agents.html, p. 1-2, Apr. 20, 2009.
"Oilfield Chemicals, 7500 Cement Defoamer", Product Sheet, Fritz Industries, Inc.
"KSIL 100S, Silicone Defoamer", Product Sheet, Emerald Performance Materials.
"Defoamer AC", Indiamart, http://www.indiamart.com/company/722932/products.html, p. 1-4, Apr. 20, 2009.
"GEMPLER's Defoamer", Product Sheet and Material Safety Data Sheet, http://www.gemplers.com/product/G45000/GEMPLERS-Defoamer, Apr. 20, 2009.
Material Safety Data Sheet, Discol 9170, pp. 1-4, Nov. 20, 2006.
Material Safety Data Sheet, Discol 9177, pp. 1-4, Apr. 10, 2001.
Material Safety Data Sheet, Colloid NF-166, pp. 1-6, Jan. 9, 2007.
Product Information, Tegopren 5825, Goldschmidt Industrial Specialties, pp. 1-2.
Product Information, Tegopren 6814, Evonik Industries, pp. 1-2.
Tegopren Product Line, Goldschmidt Industrial Specialties.
Draing et al., "Polypropylene glycol is a selective binding inhibitor for LTA and other structurally related TLR2 agonists", Eur J Immunol. vol. 38, No. 3, pp. 797-808 (2008).
Ineos Oligomers, Indopol Polybutene Specifications and Typical Properties.
Ineos Oligomers, Typical Properties, Indopol Polybutene, Grade L-14; Product Data Sheet.
BASF Corporation, Technical Bulletin,, Pluronic L61 Block Copolymer Surfactant.
Material Safety Data Sheet, Poloxamer 181, Surfactant MSDS, ScienceLab.com, pp. 1-6.

* cited by examiner

POLYMERIC DEFOAMER ADDITIVE

TECHNICAL FIELD OF THE INVENTION

The present invention relates to the use of polymers containing alkyl acrylates, hydroxyalkyl acrylates, and/or acrylic acid for defoaming in pulp and paper mill operations, particularly for use toward pulp mill black liquor as well as in the petroleum industry, water treatment, paints and coatings, food and beverage processing, the mining industry, textiles, agriculture, and the like.

BACKGROUND OF THE INVENTION

Defoamers are compositions used in the pulp and paper mill industry for the control of foam in various processes. In addition to the pulp and paper industry, defoamers are also useful in the petroleum industry, water treatment, paints and coatings, food and beverage processing, the mining industry, textiles, agriculture, and the like.

Foam control is a common industrial problem. As such, defoamers are being developed to alleviate this problem. Common defoamer compositions are generally composed of a carrier fluid, a defoaming agent and miscellaneous additives. Foaming problems often have been effectively dealt with by using various petroleum oil-based compositions containing an alkylene diamide and/or hydrophobic silica (silicone coated silica), as well as silicone emulsions and concentrates. Further, cost effective carrier fluids have often been the petroleum oils (mineral oils). Water is also often part of defoamer formulations. Various defoaming compositions have been documented in product literature and patents. See, e.g., U.S. Pat. Nos. 5,082,590; 5,096,617 and 5,071,591.

Oil-based amide defoamers contain a minimum of two ingredients: a wax with a high melting point and an oil carrier (usually derived from petroleum), in which the wax is dispersed. A commonly used wax class is the diamides. A common diamide is ethylene bis-stearamide (EBS), but other diamides or mixtures of diamides can also be found in defoamer blends. EBS is a very hydrophobic molecule that can have deposition potential if not formulated and used correctly. There have been instances where EBS has been found in unwanted deposits in pulp and paper mills. Deposition can lead to discontinuing introduction of defoaming agents that are believed to contribute to the deposition event.

The typical weight fraction of diamide is between about 2 and 10% of the composition whereas the weight fraction of the petroleum oil is often over 80%. The carrier oil varies in composition from one defoamer to another but generally consists of a low viscosity mineral oil with paraffinic or cycloparaffinic hydrocarbons. In addition to the diamides and petroleum oil, the blends may also contain other agents such as hydrophobic silica and silicone oil, various emulsifiers, and stabilizers, but these constituents generally comprise less than about 10% of the formulation.

While these diamide-based compositions are effective defoamers, they have been suspected of contributing to deposition problems in various locations in the mills. (Dorris et al. "Analysis of Amide Defoamers in Kraft Mill Pitch Deposits," J. Pulp & Paper Science, 11:5, J149-J154, September 1985) There is some evidence that the petroleum oil in this type of defoamer can lead to undesirable by-products in Kraft bleach plants (Allen. et al. manuscript distributed at the 8th International Symposium on Chlorinated Dioxins and Related Compounds, Urnes, Sweden, Aug. 21-26, 1988) In addition, they can demonstrate limited performance efficiency on paper machines because they are not able to completely disperse in water thus they have potential to form deposits and/or oil spots in the paper produced.

Alternative petroleum oil-based defoamers have been prepared from a wide variety of chemicals. For example, U.S. Pat. Nos. 3,751,373 and 3,935,121 disclose defoamers based upon a combination of a fatty acid or alcohol, a polyethylene glycol mono- or di-ester of a fatty acid, a petroleum sulfonic acid, and an organic liquid.

An example of a commercial aqueous-based defoamer is an aqueous emulsion of fatty alcohols. Although the aqueous defoamer does not contain petroleum oil phase, it does however, contain high melting waxes which have been associated at times with undesired effects in processing. These defoamers are generally not as effective as those containing EBS and their homologues, but also do not cause the spotting problem on paper machines that are associated with formulations containing oil, EBS or silicone.

Silicone has commonly been implicated as a contributor to some deposition issues in various processing steps. If not properly formulated and applied, these materials can cause similar or the same problems as oil-containing defoamers. As a result, many pulp and paper mills avoid using silicone containing products.

Therefore there is a need for a cost effective and environmentally friendly defoamer formulation which does not contain oil, EBS or free silicone and performs as good as, if not better than pre-existing defoamers.

SUMMARY OF THE INVENTION

The present invention relates to a cost-effective and environmentally friendly defoamer formulation which does not contain oil, EBS or free silicone for use in various industrial applications. The defoamer formulation of the present invention comprises a mixture of polymer containing acrylic acid, methacrylic acid, or a combination or either in a suitable diluent, an organic carrier, an additive, and/or a surfactant.

DETAILED DESCRIPTION OF THE INVENTION

The present invention is directed towards a cost-effective and environmentally friendly polymeric defoamer formulation for use in several industrial applications including, but not limited to: i) controlling or destroying foam in various processes associated with pulp and paper processing, such as in the Kraft pulping process, sulfite pulping process, thermomechanical pulping (TMP) process, Chemical TMP (CTMP) process, groundwood pulping process, carbonate pulping process, paper machine processes, screen rooms, bleach plants, and the like; ii) preventing inhomogenuity such as craters and rough appearances from forming due to entrained air during the manufacturing of paints and/or coatings for metal, wood, plastics, concrete, and the like; iii) preventing streaking during ink production caused by air bubbles; iv) efficiently controlling flow properties of cement by minimizing air entrainment in the cement slurry; v) increasing drilling efficiency in oil wells by minimizing the effects of unwanted air; vi) controlling foam production during treatment of municipal and commercial waste water; vii) reducing foam buildup associated with the production and storage of ethanol fuel along with cleaning production vessels; viii) preventing and controlling foam buildup associated with the storage of fertilizer in spray tanks in order to free vessel space; ix) preventing the formation of foam buildup in fluids used during metalworking; x) preventing foam buildup and overflow during syntheses of Active Pharmaceutical Ingredients (API); and xi) controlling foam produced during the washing process prior to plastics recycling.

The new defoamer formulation of the present invention unexpectedly produces increases in performance over traditional defoamer technology. Further, the addition of acrylic acid or methacrylic acid to the monomer premix increased performance over monomer premix that did not have acrylic acid or methacrylic acid. The performance was unexpectedly higher than traditional technology at equal dosages.

The essential constituents of the defoamer formulation comprise an acrylate or methacrylate polymer with or without acrylic acid or methacrylic acid in a suitable diluent, organic carrier(s), an additive, and/or a surfactant.

The combination of different monomers in the polymer composition may also be used. The most robust performance is observed when the polymer contains acrylic acid as well as an alkyl acrylate and a hydroxyalkyl acrylate. The addition of acrylic acid to the polymer chain differentiates the polymeric defoamer formulation of the present invention from other polymers used in the past to enhance defoamer performance. The use of methacrylate derivatives are effective as well against foam. A defoamer containing methacrylate derivatives outperforms formulations consisting of the acrylate analogues.

Monomers:

Examples of general monomers used singly or in combination in the present invention to form polymers which are soluble in organic solvents are acrylates, methacrylates, styrene, acrylonitrile, vinyl alkyl ethers, vinyl alkyl esters, hydroxyl alkyl acrylates and methacrylates, fumaric and maleic acid diesters, vinyl acetate, acrylic acid, methacrylic acid, and the like. The preferred general monomers used in the present invention are acrylates and methacrylates.

The preferred monomers of the present invention are of the general formula:

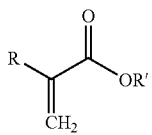

wherein R is hydrogen or methyl.

R' is hydrogen or a linear or branched alkyl group containing from about 1 to 18 carbon atoms and/or at least one hydroxy group anywhere on the alkyl chain. Suitable R' groups are selected from, but not limited to, 2-ethylhexyl, 1-, 2-hydroxyethyl, 1-, 2-, or 3-hydroxypropyl, 1-, 2-, or 3-hydroxyisopropyl, or 1-, 2-, 3-, or 4-hydroxybutyl.

The most preferred acrylate monomers include 2-ethylhexyl acrylate (2EHA), 2-hydroxyethyl acrylate (2HEA), and/or acrylic acid.

The most preferred methacrylate monomers include 2-ethylhexyl methacrylate, 2-hydroxyethyl methacrylate, and/or methacrylic acid.

Polymers:

Acrylate polymers useful in the present invention are those polymers obtained by polymerization of one or any combination of an alkyl acrylate monomer, a hydroxyalkyl acrylate monomer and/or acrylic acid monomer. Methacrylate containing polymers that are also useful in the present invention are those polymers obtained by polymerization of an alkyl methacrylate monomer, a hydroxyalkyl methacrylate monomer, and/or methacrylic acid monomer, or combinations of acrylates and methacrylates.

The polymers of the present invention may be prepared in any suitable manner known by one of ordinary skill in the art Generally, they will be prepared with or without the addition of acrylic acid or methacrylic acid in an organic diluent in the presence of a free radical generating catalyst.

The amount of acrylic acid and/or methacrylic acid that may be used in the monomer premix for the preparation of the polymers is selected from, but not limited to, up to about 25 mol % of the polymer, preferably from about 1 to 20 mol % of the polymer, and most preferably about 8 mol % in the polymer.

Organic Diluents:

Examples of suitable organic diluents for use in the present invention may be selected from, but not limited to, diisodecyl phthalate, diisooctyl adipate, diisooctyl phthalate, bis-2-ethylhexyl adipate, dioctyl adipate, 2-ethyl-1-hexanol, isooctyl alcohol, dihexyl phthalate, and/or mixtures thereof. Preferred diluents are diisodecyl phthalate and diisooctyl adipate, with the most preferred being diisooctyl adipate.

Catalysts:

Examples of free radical generating catalysts for use in the present invention may be selected from, but not limited to, 2,2'-azobis(2-methylpropanenitrile), 2,2'-azobis(2,4-dimethylpentanenitrile), or 2,2'-azobis(2-methylbutanenitrile). The most preferred free radical generating catalyst is 2,2'-azobis(2-methylpropanenitrile). Alternatively, redox catalyst systems such as bromate/sulfide or persulfate/ferrous systems may be used. In addition, peroxides such as benzoyl peroxide may be used to generate the free radicals. Alternative free radical generating catalysts may be used as disclosed in U.S. Pat. No. 5,152,925, which is herein incorporated by reference in its entirety.

Organic Carriers:

Examples of suitable organic carriers for use in the present invention may be selected from, but not limited to, the same organic diluents used to make the polymers, polybutenes having a molecular weight of from about 300-1300 atomic mass units, dialkyl phthalates, fatty acid esters, polyethylene and polypropylene glycol and esters thereof, and the like, or mixtures thereof. The preferred organic carriers are polybutenes having a molecular weight of from about 300-1300 atomic mass units and polypropylene glycol, and most preferably polypropylene glycol.

Surfactants:

Examples of suitable surfactants for use in the present invention may be selected from, but not limited to, polyethylene glycol, polypropylene glycol, polypropylene triol, butoxy polypropylene polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, and the like. The preferred surfactants are siloxane-based and polypropylene-polyethylene glycol, and most preferably polyether-modified polysiloxanes and/or alkyl modified siloxanes.

Additives:

Examples of suitable additives for use in the present invention may be selected from, but not limited to, hydrophobic silica, waxes, fatty alcohols, fatty acid esters, fatty alcohol esters, or fatty acids, with the most preferred being hydrophobic silica.

The introduction of surfactants and additives into the resulting defoamer formulation of this invention improves initial and/or overall performance of the defoamer formulations of the present invention. Moreover, it is understood that routine experimentation by one of ordinary skill in the art will determine which and how much specific surfactants and other materials are to be used for a particular application.

Formulations:

The final defoamer formulation may contain a mixture of up to about 60% acrylate or methacrylate polymer with or without acrylic or methacrylic acid in a suitable diluent, about 20-80% organic carrier, up to about 15% additive, and/or up to about 30% surfactants of varying compositions. If acrylic or methacrylic acid is used, the mole percentage of said acid may be up to about 25 mol %.

A preferred mixture of the final defoamer formulation may contain about 15-35% acrylate or methacrylate polymer with or without acrylic or methacrylic acid in a suitable diluent, about 30-70% organic carrier, up to about 10% additive, and about 5-25% surfactants. If acrylic or methacrylic acid is used, a preferred ratio of said acid is about 5-15 mol %.

Another preferred mixture of the final defoamer formulation may contain about 20-30% acrylate or methacrylate polymer with or without acrylic or methacrylic acid in a suitable diluent, about 40-60% organic carrier, about 3-10% additive, and about 10-15% surfactants. If acrylic or methacrylic acid is used, a preferred ratio of said acid is about 8 mol % of the polymer.

One of ordinary skill in the art will appreciate that the individual components of the present invention may change in the formulations depending on the physical and chemical qualities needed for the defoamer in a given process and/or application to which the defoamer will be applied. For example, the dispersibility of the defoamer in water can be adjusted as necessary to obtain the desired performance. An example would be a brown stock washer, paper machine, effluent, and paint defoamer would all have different water dispersibility properties based on their needs.

Depending on the physical and chemical qualities that are needed for a given application or process, the typical dosage or feed rate of from about 2-50 parts per million (ppm) of defoamer will be suitable Uses:

The formulation of the present invention will effectively prevent foam formation and/or destroy preexisting foam in a variety of industrial applications. Further more, the defoamer formulation of the present invention may or may not be water dispersible.

The cost-effective and environmentally friendly polymeric defoamer formulation is particularly useful in pulp and paper processing. The defoamer formulation of the present invention can be applied in both alkaline and acidic processes in pulp mills without the use of mineral oil, Ethylene bis-stearamide (EBS), or free silicone fluid. The defoamer efficiently controls or destroys foam in various processes, such as but not limited to the Kraft pulping process, sulfite pulping process, thermomechanical pulping (TMP), chemical TMP (CTMP), groundwood pulping, carbonate pulping, paper machine processes, screen room, and bleach plant.

The formulation of the present invention is efficient as a defoamer in the paint and coating industry. The formulation prevents, among other things, undesirable inhomogeneity such as craters and rough appearances from forming due to entrained air during the manufacturing of paints or coatings for metal, wood, plastics, concrete, and the like. In addition, the defoamer formulation also efficiently controls foam buildup in the polymer emulsion associated with water-based PVC paints.

In the ink industry, the formulation of the present invention, among other things, effectively removes and/or controls air bubbles formed during ink production. This in turn prevents any streaking or cratering in the ink, thereby providing a uniform, high quality ink product.

The defoamer formulation is also useful in the cement industry in order to, among other things, efficiently decrease foam production during preparation of cement slurries. As such, air entrainment in the cement slurry is minimized, thus leading to increased flow properties in the cement. The minimization of air entrainment in the cement slurry also results in a more structurally sound cement lattice.

In the oil industry, the formulation of the present invention is also useful as a defoamer. For instance, when added to an oil well, the defoamer effectively lowers the interfacial tension of the crude oil, thus allowing entrained gas to easily escape. This in turn, leads to an increase in drilling efficiency. In addition, the defoamer also effectively controls air entrainment in crude oil during the heating process in distillation columns.

The foam buildup and air entrainment commonly associated with the treatment of waste water in municipal and commercial settings, such as clarifiers, flumes, outfalls, effluent ponds, and the like, are effectively controlled by the formulation of the present invention. Further, the formulation also effectively controls foam and air entrainment in both cold and hot applications.

In the fuel ethanol processing industry, the formulation of the present invention is effective in reducing foam buildup associated with the production and storage of ethanol fuel along with facilitating effective CIP (Cleaning-In-Place) of, among others, evaporators, bottle-washing applications, or anywhere foam may need to be eliminated.

Additionally, for non-fuel ethanol fermentation processes, the formulation is also effective in controlling foam produced by enzymes without compromising either enzyme performance or ethanol quality.

In the fertilizer industry, the formulation efficiently prevents and/or controls foam build-up in spray tanks as a result of, for example, addition of phosphate rock to nitric acid. Addition of the formulation directly to the spray tanks prevents the formation of foam without affecting the performance of the fertilizer. This in turn, frees reactor capacity, which would otherwise be occupied by foam.

The defoamer formulation of the present invention is also useful in the metalworking industry. The formulation effectively prevents the formation of foam in various metalworking fluids, such as soluble oil, semi-synthetic, synthetic, micro-emulsion fluids, and the like during metal production.

In the food and beverage processing industry, the formulation of the present invention efficiently prevents and/or destroys foam production in vessels used for washing, cutting, heating, and the like. As a result, overflow of foam out of the vessels is prevented and more vessel space is made available.

The formulation of the present invention is also useful as a defoamer in the medical and pharmaceutical industries without compromising the effectiveness of the Active Pharmaceutical Ingredient (API). The formulation effectively prevents and/or destroys foam production in reaction vessels during large-scale syntheses of API's, which also prevents the foam from overflowing out of the reaction vessels.

In the plastics recycling industry, prior to recycling, the plastics must be washed with detergents. The conditions are rather harsh with high temperatures and highly basic pH's. As a result, severe foaming is problematic. The defoamer formulation of the present invention effectively controls the foaming associated with the detergents and harsh conditions associated with plastics recycling.

The defoamer formulation of the present invention is in no way limited only to the uses discussed above. As such, the defoamer formulation of the present invention can also be used in any industry that may require the control or destruction of foam.

ABBREVIATIONS AND DEFINITIONS

"Foam" is defined herein to mean a dispersion of a gas (usually air) in a liquid or solid.

"Defoamer" is defined herein to mean a compound or composition used to inhibit the formation of foam or destroy existing foam.

"Water dispersible" is defined herein to mean a liquid, semi-solid, or solid which is not soluble in aqueous media, but rather can be uniformly distributed in an aqueous media.

"Water insoluble" is defined herein to mean a liquid, semi-solid, or solid which is not capable of being completely dissolved or uniformly distributed in an aqueous media.

"Aqueous media" is defined herein to mean media in which water is the main constituent. Aqueous media may comprise water that is completely clear, a colloidal suspension, pulp slurry, and the like.

"Free silicone" is defined herein to mean silicone that is not bound to another non-silicone constituent.

"Dose" is defined herein to mean the amount of defoamer formulation needed to be added to a particular application or process to achieve a desired positive outcome.

"CIP" as used herein refers to Cleaning-In-Place and is defined herein to mean spray cleaning a vessel with a minimum amount of hand detailing.

"2EHA" as used herein refers to 2-ethylhexyl acrylate.
"2HEA" as used herein refers to 2-hydroxyethyl acrylate.
"DIOA" as used herein refers to diisooctyl adipate.
"DIDP" as used herein refers to diisodecyl phthalate.
"PVC" as used herein refers to polyvinyl chloride.
"Room temperature" as used herein refers generally to temperatures in the range of 20 to 30° C., with an average temperature being 25° C.

EXAMPLES

Evaluation of Samples

The Foam and Entrained Air Tester (FEAT) is a testing apparatus used to determine the efficacy of defoamers in a laboratory setting. The apparatus measures the change in the density of the liquor/filtrate as the defoamer is introduced. Traditional defoamer foam cell tests only measure the effects a defoamer has on the surface foam. The measure of the change in density of a filtrate is a direct measurement of the change in entrained air. In pulp and paper mills, presence of entrained air can impede mat formation and drainage.

Testing of the different samples utilizes a recirculatory foam cell attached to a pump. The hose leading from the pump is connected to a density meter, which is then connected back to the top of the foam cell. Black liquor from the first stage washer from a southeast Georgia Kraft process mill is used in all of the testing. The liquor is heated to 82° C. The heated black liquor is added to the test unit and pumped through the unit to fill the lines. The level of the liquor is then lowered to the 18 cm mark on the tube before the test is started. Once the pump is turned on, the defoamer is added when the density dropped, due to air entrainment, to a specified density measurement, usually between 0.8 and 1.0 g/cc. The tests are run for a total of 180 seconds. A line graph is then generated to show the change in density of the liquor of the time period. The area under the curve for each test is then calculated. There are two different areas calculated: the area under the curve during the first 30 seconds is calculated to provide a measure of the initial deaeration of the sample, and the area under the curve for the total test time is calculated to provide a measure of the overall performance of each sample. Those samples having the highest area under the curve measurements are those samples that performed the best. All tests were run in duplicate and the averages of the two runs are reported. Results are reported both as area under the curve and as a percent difference when compared to the standard. Unless otherwise noted, the standards are the example products from the patent. The range of experimental error for this test method is +/−10%. Testing of other filtrates (effluent, paper machine, starch, etc.) was completed using the above method as well. Table 1 below is merely an illustration of how data is presented in the following examples.

TABLE 1

Example of Results:

| | Product 1 3000 µL | Product 2 3000 µL | Product 3 200 µL | Product 4 1000 µL |
|---|---|---|---|---|
| 1st 30 Seconds Area | 12.3 | 12.3 | 11.0 | 10.1 |
| Total Runtime Area | 72.3 | 74.4 | 85.4 | 61.9 |
| Percent Difference from Standard | | 2.9% | 18.1% | −14.3% |

Table 1 above shows the product name and the dosage used for that test (Product 1, dosed at 3000 µL). The number below the name and dosage is the area under the curve during the first 30 seconds of the test (12.31930). The second number is the area under the curve for the entire test time (72.28433).

The bottom numbers are the % differences in total area between the standard/control's total area under the curve and the experimental samples' total area under the curve. In the case above, Product 3, dosed at 200 μL, yielded an 18.1% increase in performance over Product 1. Product 4, dosed at 1000 μL, yielded a 14.3% decrease in performance when compared to Product 1. In the above example, Product 3 would be the best performing product—not only did the product provide an 18% increase in performance, the product accomplished the increase despite having a dosage that was $\frac{1}{15}^{th}$ that of the standard, Product 1.

All parts and percents are by weight unless otherwise specified. Additionally, all trademarks are defined throughout the specification.

Example 1

Preparation of Acrylate Polymer in DIOA

A polymer containing 10-30% hydroxyl alkyl acrylate and 70-90% alkyl acrylate by weight percent was prepared as follows: 250 g of diisooctyl adipate (DIOA) was placed into a reaction flask. A vacuum was applied for 20 minutes to remove dissolved air. DIOA was sparged with nitrogen while being heated to 79-82° C. with mixing. Once at temperature and with the nitrogen sparge and constant mixing, a free radical generating compound was added and allowed to dissolve over a 5 minute period. Meanwhile, the acrylate monomers were pre-mixed in a beaker. The monomer mixture was added to the DIOA diluent through an addition funnel at a rate of approximately 1.5 g/minute, making sure to maintain a temperature of approximately 79-82° C. After the monomer blend addition, 48 g of DIOA were used to rinse the monomer blend container and addition funnel, and the DIOA rinse was added to the reaction flask. Another 0.5 g of free radical generating compound was added, and the mixture was held at 79-82° C. with mixing and nitrogen for 2 hours. The mixture was then air cooled to room temperature.

The resulting polymer was clear and colorless, having a viscosity of 1100 cps as measured by a Brookfield viscometer, spindle 3, speed 50 at 25° C.

Example 2

Comparison to Example II of U.S. Pat. No. 5,152,925 ('925)

Experimental products were made following the formulations given in Example II of the '925 patent. Analogs of the examples were also made using the polymer from Example 1 above. Below are the formulations, along with their corresponding numerical designations, i.e., 265-57-1.

TABLE 2

| Example Products from the '925 Patent | | | |
|---|---|---|---|
| | 265-57-1* (standard) | 265-55-1 | 265-57-3 |
| Polybutene | | 70 | 50 |
| DIDP | 70 | | 20 |

TABLE 2-continued

| Example Products from the '925 Patent | | | |
|---|---|---|---|
| | 265-57-1* (standard) | 265-55-1 | 265-57-3 |
| Acrylate Polymer in DIDP | 30 | 30 | 30 |

*Example from the '925 patent

TABLE 3

| Analogs of the '925 Patent Examples with Acrylate polymer in DIOA | | | |
|---|---|---|---|
| | 265-57-2 | 265-55-2 | 265-57-4 |
| Polybutene | | 70 | 50 |
| DIDP | 70 | | 20 |
| Acrylate Polymer in DIOA | 30 | 30 | 30 |

TABLE 4

| Best Previous Performing Defoamer | |
|---|---|
| | 265-54-2 |
| Polypropylene Glycol | 58.5 |
| Hydrophobic Silica | 3 |
| Acrylate Polymer in DIOA | 23.5 |
| Polyether-Modified Polysiloxane Silicone Surfactant | 10 |
| Alkyl Modified Siloxane Silicone Wax | 5 |

TABLE 5

| Polybutene Containing Samples* | | | |
|---|---|---|---|
| | 265-55-1 3000 μL | 265-55-2 3000 μL | 265-54-2 200 μL |
| 1st 30 Seconds Area | 6.5 | 8.4 | 11.2 |
| Total Runtime Area | 53.1 | 73.3 | 84.7 |
| Percent Difference from Standard | | 38.1% | 59.6% |

*See Tables 2, 3, and 4 above for formulations corresponding to numeric designations

TABLE 6

| DIDP Containing Samples* | | | |
|---|---|---|---|
| | 265-57-1 3000 μL | 265-57-2 3000 μL | 265-54-2 200 μL |
| 1st 30 Seconds Area | 7.9 | 6.5 | 11.4 |
| Total Runtime Area | 59.4 | 56.4 | 87.3 |
| Percent Difference from Standard | | −5.1% | 46.9% |

*See Tables 2, 3, and 4 above for formulations corresponding to numeric designations

TABLE 7

Polybutene and DIDP Containing Samples*

|  | 265-57-3 3000 μL | 265-57-4 3000 μL | 265-54-2 200 μL |
| --- | --- | --- | --- |
| 1st 30 Seconds Area | 8.0 | 8.8 | 11.4 |
| Total Runtime Area | 54.6 | 67.8 | 87.3 |
| Percent Difference from Standard |  | 24.3% | 60.0% |

*See Tables 2, 3, and 4 above for formulations corresponding to numeric designations Testing Results:

Testing was completed in three different sets: products containing just polybutene, products containing just DIDP, and products containing a combination of polybutene and DIDP. Each set was run twice, and the runs were averaged. There was a large disparity in the dosage of the products. The examples from Example II of the '925 patent, as well as the analogs, needed a dosage of 3000 μL in order to produce an acceptable test, while experimental 265-54-2 needed only 200 μL, while yielding results that ranged from 46.9 to 60.0% better performance.

Example 3

Testing the Effects of Surfactants

The '925 patent states that the addition of a water soluble surfactant having a cloud point of 21-38° C., at levels of 0.25% to 3%, increases the drainage properties of the examples while maintaining excellent defoaming activity. In laboratory testing, the increase in drainage is typically measured as an increase in the performance of the defoamer during the 30 seconds after the defoamer is introduced. In an effort to test the examples, experimental products were made using the formulations from Example II in the '925 patent, and adding 0.25% and 3% of an ethylene oxide/propylene oxide block copolymer surfactant which meets the water solubility and cloud point criteria. These experimental products were tested and compared to the defoaming performance of 265-54-2. As in the case of Example II above, analogs of each of the samples were made using the Acrylate polymer in DIOA. Below are the formulations and test results obtained.

TABLE 8

Formulations Containing Polybutene and Ethylene Oxide/Propylene Oxide Block Copolymer Surfactant

|  | 265-56-1 | 265-56-2 | 265-56-3 | 265-56-4 |
| --- | --- | --- | --- | --- |
| Polybutene (MW = 370) | 69.8 | 69.8 | 67 | 67 |
| Acrylate Polymer in DIDP | 30 |  | 30 |  |
| Ethylene Oxide/Propylene Oxide Block Copolymer Surfactant | 0.3 | 0.3 | 3 | 3 |
| 2EHA/2HEA Polymer in DIOA |  | 30 |  | 30 |

TABLE 9

Testing Results from Polybutene and Ethylene Oxide/Propylene Oxide Block Copolymer Surfactant Containing Defoamers*

|  | 265-56-1 3000 μL | 265-56-2 3000 μL | 265-56-3 3000 μL | 265-56-4 3000 μL | 265-54-2 150 μL | 265-54-2 200 μL |
| --- | --- | --- | --- | --- | --- | --- |
| 1st 30 Seconds Area | 7.0 | 8.4 | 10.4 | 11.4 | 9.0 | 11.2 |
| Total Runtime Area | 55.3 | 72.6 | 69.1 | 79.3 | 68.7 | 84.7 |
| Percent Difference from Standard |  | 31.4% | 25.0% | 43.4% | 24.3% | 53.3% |

*See Tables 4 and 8 above for formulations corresponding to numeric designations Testing Results:

From Table 9 above, testing results show 265-56-2, 265-56-4, and 265-54-2 dosed at 200 μL, all of which contain the Acrylate polymer in DIOA outperform 265-56-1 and 256-56-3, both of which contain the Acrylate polymer in DIDP, regardless of the surfactant level. Testing also shows that the 265-54-2 formulation dosed at 200 μL outperforms all of the other examples at $\frac{1}{15}^{th}$ the dosage, regardless of which polymer is present.

TABLE 10

Formulations Containing DIDP and Polybutene

|  | 265-58-1 | 265-58-2 | 265-58-3 | 265-58-4 |
| --- | --- | --- | --- | --- |
| DIDP | 69.8 | 69.8 | 67 | 67 |
| Acrylate Polymer in DIDP | 30 |  | 30 |  |
| Polybutene | 0.3 | 0.3 | 3 | 3 |
| Acrylate Polymer in DIOA |  | 30 |  | 30 |

TABLE 11

Testing Results from DIDP and Polybutene Containing Defoamers*

|  | 265-58-1 3000 μL | 265-58-2 3000 μL | 265-58-3 3000 μL | 265-58-4 3000 μL | 265-54-2 150 μL | 265-54-2 200 μL |
|---|---|---|---|---|---|---|
| 1st 30 Seconds Area | 7.5 | 6.3 | 9.3 | 7.5 | 9.8 | 11.4 |
| Total Runtime Area | 58.3 | 55.9 | 65.0 | 62.8 | 69.4 | 87.3 |
| Percent Difference from Standard |  | −4.1% | 11.5% | 7.7% | 19.0% | 49.7% |

*See Tables 4 and 10 above for formulations corresponding to numeric designations Testing Results:

The results in Table 11 above show that 265-58-3, which contains high levels of DIDP diluent in conjunction with the Acrylate polymer in DIDP outperforms 265-58-2 and 265-58-4, which contain the Acrylate polymer in DIOA diluted with DIDP. This difference in performance is within the range of experimental error. Testing also shows that the 265-54-2 formulation outperforms all of the other examples at $\frac{1}{15}^{th}$ and $\frac{1}{20}^{th}$ the dosage, regardless of which polymer is present.

TABLE 12

Formulations Containing DIDP, Polybutene and Ethylene Oxide/Propylene Oxide Block Copolymer Surfactant

|  | 265-58-5 | 265-58-6 | 265-58-7 | 265-58-8 |
|---|---|---|---|---|
| Polybutene | 50 | 50 | 50 | 50 |
| DIDP | 19.8 | 19.8 | 17 | 17 |
| Acrylate Polymer in DIDP | 30 |  | 30 |  |
| Ethylene Oxide/Propylene Oxide Block Copolymer Surfactant | 0.3 | 0.3 | 3 | 3 |
| Acrylate Polymer in DIOA |  | 30 |  | 30 |

Testing Results:

These test results show that 265-58-6 and 265-58-8, which contain the Acrylate polymer in DIOA consistently outperforms 265-58-7, regardless of the surfactant level. Testing also shows that the 265-54-2 formulation outperforms all of the examples at $\frac{1}{15}^{th}$ and $\frac{1}{20}^{th}$ the dosage, regardless of which polymer is present.

Example 4

Efficacy of the Defoamer Formulations

To test the efficacy of the defoamer formulations, products were made and tested against 265-54-2. Below are the formulations and test results from this testing.

TABLE 14

Formulations Containing Hydrophobic Silica

|  | 265-59-1 | 265-59-2 |
|---|---|---|
| Acrylate Polymer in DIDP | 30 |  |
| Acrylate Polymer in DIOA |  | 30 |
| Hydrophobic Silica | 5 | 5 |
| DIDP | 15 | 15 |
| Polybutene | 50 | 50 |

TABLE 13

Testing Results from DIDP, Polybutene and Ethylene Oxide/Propylene Oxide Block Copolymer Surfactant Containing Defoamers*

|  | 265-58-5 3000 μL | 265-58-6 3000 μL | 265-58-7 3000 μL | 265-58-8 3000 μL | 265-54-2 150 μL | 265-54-2 200 μL |
|---|---|---|---|---|---|---|
| 1st 30 Seconds Area | 8.0 | 9.2 | 10.5 | 10.4 | 9.8 | 11.4 |
| Total Runtime Area | 56.1 | 68.5 | 63.4 | 64.8 | 69.4 | 87.3 |
| Percent Difference from Standard |  | 22.1% | 13.1% | 15.6% | 23.6% | 55.6% |

*See Tables 4 and 12 above for formulations corresponding to numeric designations

TABLE 15

Testing Results from Defoamer Formulations Containing Hydrophobic Silica*

|  | 265-59-1 3000 µL | 265-59-2 3000 µL | 265-54-2 200 µL |
|---|---|---|---|
| 1st 30 Seconds Area | 12.3 | 12.3 | 11.0 |
| Total Runtime Area | 72.3 | 74.4 | 85.4 |
| Percent Difference from Standard |  | 2.9% | 18.1% |

*See Tables 4 and 14 above for formulations corresponding to numeric designations Testing Results:

Testing did show an increase in performance of 265-59-2 when 5% hydrophobic silica was incorporated into the products. However, 265-59-2 did not perform as well as 265-54-2, even at 15 times the dosage. Repeated testing of experimental defoamer 265-54-2 shows superior defoaming capabilities. A dosage of 3000 µL, (approximately 60 ppm) is considered excessive in laboratory testing of first stage black liquor filtrate. A typical dosage for an oil based defoamer in $1^{st}$ stage black liquor is typically 250-500 µL.

It was first assumed the change from DIDP to DIOA was neutral, based on Foam Cell test (measuring foam height vs. time) results, but upon beginning testing and evaluation of developed samples using the FEAT unit to evaluate samples (FEAT measures liquid density over time) it was discovered there was in fact a difference between the two polymer systems; the polymer made in DIOA performed better than the polymer made in DIDP.

Example 5

Direct Comparison of the Polymer in the Different Diluents

Samples were made and tested in an effort to test whether the diluent used affects the performance of the polymer in the FEAT unit. Below are the formulations of the products and the results from the testing.

TABLE 16

Formulations of Polymers made and Diluted in Different Diluents

|  | 265-57-1 | 265-57-2 | 265-83-1 | 265-83-2 |
|---|---|---|---|---|
| Acrylate Polymer in DIDP | 30 |  | 30 |  |
| Acrylate Polymer in DIOA |  | 30 |  | 30 |
| DIDP | 70 | 70 |  |  |
| DIOA |  |  | 70 | 70 |

TABLE 17

Results from Testing Polymers in DIDP

|  | 265-57-1 3000 µL | 265-57-2 3000 µL |
|---|---|---|
| 1st 30 Seconds Area | 7.9 | 6.5 |
| Total Runtime Area | 59.4 | 56.4 |
| Percent Difference from Standard |  | −5.1% |

TABLE 18

Results from Testing Polymers in DIOA

|  | 265-83-1 3000 µL | 265-83-2 3000 µL |
|---|---|---|
| 1st 30 Seconds Area | 1.7 | 1.2 |
| Total Runtime Area | 6.8 | 8.3 |
| Percent Difference from Standard |  | 21.8% |

Testing Results:

Table 17 shows that the Acrylate polymer in DIOA, when diluted in DIDP, has slightly lower performance than the Acrylate polymer in DIDP diluted in DIDP, but within experimental error. Table 18 shows that the Acrylate polymer in DIOA, when diluted in DIOA, improves the performance 22% over 2EHA/2HEA polymer in DIDP diluted with DIOA.

Example 6

Improvement of Acrylate Polymer in DIOA with Acrylic Acid

Experiments were conducted in an effort to determine if the performance of the Acrylate polymer in DIOA could be improved. The procedures of Example 1 above were repeated to prepare and evaluate a series of polymers to determine their defoaming capacity. These products were produced by lowering the amount of hydroxyalkyl acrylate and alkyl acrylate in the DIOA diluted polymer and replacing that amount with glacial acrylic acid, which was added into the premix of the monomers. The resulting polymers where used as a replacement for the polymer component of 265-54-2. Below is the mol % of acrylic acid added to the monomer pre-mix, as well as the formulations and results from the testing.

TABLE 19

Mol % Acrylic Acid in Polymer

| Numeric Designation | Mol % Acrylic Acid in Polymer |
|---|---|
| 265-64 | 1% |
| 265-60 | 4.3% |
| 265-65 | 8% |
| 265-67 | 20% |

TABLE 20

Formulations with Acrylic Acid Polymers

|  | 265-66-1 | 265-61 | 265-66-2 | 265-68 |
|---|---|---|---|---|
| Polypropylene Glycol | 31.5 | 31.5 | 31.5 | 31.5 |
| 10% Hydrophobic Silica Base in Polypropylene Glycol | 30 | 30 | 30 | 30 |
| Polyether-Modified Polysiloxane Silicone Surfactant | 10 | 10 | 10 | 10 |
| Alkyl Modified Siloxane Silicone Wax | 5 | 5 | 5 | 5 |
| 265-64 | 23.5 |  |  |  |
| 265-60 |  | 23.5 |  |  |
| 265-65 |  |  | 23.5 |  |
| 265-67 |  |  |  | 23.5 |

TABLE 21

Performance of Formulations Containing Acrylic Acid Polymers*

|  | 265-54-2 Acrylate Polymer in DIOA | 265-66-1 1 Mol % | 265-61 4 Mol % | 265-66-2 8 Mol % | 265-68 20 Mol % |
|---|---|---|---|---|---|
| 1st 30 Seconds Area | 9.3 | 9.6 | 9.6 | 10.2 | 10.7 |
| Total Runtime Area | 40.1 | 50.2 | 52.5 | 56.6 | 54.4 |
| Percent Difference from Standard |  | 25.4% | 31.0% | 41.4% | 35.9% |

*See Tables 4 and 20 above for formulations corresponding to numeric designations Testing Results:

The testing shows that by including acrylic acid in the monomer premix, the resulting polymer provides a significant increase in performance to the final defoamer formulation when compared to 265-54-2, which has no acrylic acid. This improved performance was well beyond the increase that was observed by switching from DIDP to DIOA. Thus, this level of increase was unexpected.

Effect of Different Diluents on Performance:

After showing that the addition of 8 mol % acrylic acid to the Acrylate polymer in DIOA significantly improves performance, samples of the polymer were made in DIDP to examine if the difference in diluent will affect performance. The manufacturing procedure from Example 1 above was used, whereby the DIOA was replaced with DIDP. The resulting polymer, 265-84, was a very viscous liquid (>140,000 cps). The products that were made using 265-84 were tested against the products made from DIOA analog 265-65. Below are the formulations and results from the testing.

TABLE 22

Formulations Containing 8 Mol % Acrylic Acid

|  | 265-85-1 | 265-85-2 | 265-85-3 | 265-85-4 |
|---|---|---|---|---|
| DIDP | 70 |  | 70 |  |
| DIOA |  | 70 |  | 70 |
| 265-65 8 Mol % in DIOA |  |  | 30 | 30 |
| 265-84 8 Mol % in DIDP | 30 | 30 |  |  |

TABLE 23

Results of Testing the 8 Mol % Polymers

|  | 265-85-1 Avg 2500 µL | 265-85-2 Avg 2500 µL | 265-85-3 Avg 2500 µL | 265-85-4 Avg 2500 µL |
|---|---|---|---|---|
| 1st 30 Seconds Area | 3.1 | 7.3 | 5.4 | 8.0 |
| Total Runtime Area | 3.2 | 37.9 | 34.3 | 63.7 |
| Percent Difference from Standard |  | 1093.2% | 979.3% | 1904.6% |

Testing Results:

Table 23 shows that 8 mol % polymer, 265-85-4, made in DIOA and diluted with DIOA outperforms polymer, 265-85-3, made in DIOA and diluted with DIDP. Polymer, 265-85-2, made in DIDP and diluted with DIOA even outperforms 265-85-3. Also, an increase in performance of over 1900% was observed over the standard. Although an increase in performance was expected, an increase of over 1900% certainly was not.

Effect of 8 Mol % Acrylic Acid:

The 8 mol % acrylic acid polymer was tested against Acrylate polymer in DIDP and Acrylate polymer in DIOA. Below are the formulations and results from the testing.

TABLE 24

Formulations Containing 8 Mol % Acrylic Acid

|  | Acrylate Polymer in DIDP | Acrylate Polymer in DIOA | 8 Mol % |
|---|---|---|---|
| 2EHA/2HEA Polymer in DIDP | 30 |  |  |
| DIDP | 70 |  |  |
| 2EHA/2HEA Polymer in DIOA |  | 30 |  |
| DIOA |  | 70 | 70 |
| 265-65 8 Mol % Acrylic Acid |  |  | 30 |

TABLE 25

Results from 8 Mol % Acrylic Acid Testing in DIOA

|  | Acrylate Polymer in DIDP Avg | Acrylate Polymer in DIOA Avg | 8 Mol % Acrylic Acid in DIOA Avg |
|---|---|---|---|
| 1st 30 Seconds Area | 4.9 | 6.6 | 8.9 |
| Total Runtime Area | 39.4 | 47.9 | 60.8 |
| Percent Difference from Standard |  | 21.4% | 54.4% |

Testing Results:

Testing shows that the product containing 8 mol % acrylic acid performed 54% better than the product containing Acrylate polymer in DIDP, and 33% better than the product containing Acrylate polymer in DIOA.

Example 7

Comparison to Oil Based Defoamers

One of the criteria that was set for the present invention was that the newly created defoamer formulations must perform as well as traditional oil based defoamers (paraffinic oil, EBS, silicone fluid, hydrophobic silica). The oil based defoamer that was chosen as the standard contained 4.9% EBS, 4.5% hydrophobic silica, 0.5% Polydimethylsiloxane (PDMS) silicone fluid, 0.5% silicone surfactant, and the remainder as paraffinic oil. This defoamer was tested against different experimental defoamers at equal dosages (150 µL) in 82° C. first stage filtrate. Below are the formulations and results from the testing.

TABLE 26

Results for New Formulations Versus Traditional Oil Based Defoamer*

|  | Oil Base Defoamer | 265-54-2 Acrylate Polymer in DIOA | 265-66-1 1 Mol % | 265-61 4 Mol % | 265-66-2 8 Mol % | 265-68 20 Mol % |
|---|---|---|---|---|---|---|
| 1st 30 Seconds Area | 8.7 | 6.2 | 6.6 | 6.5 | 7.1 | 7.6 |
| Total Runtime Area | 10.7 | 23.5 | 33.7 | 35.9 | 40.1 | 37.9 |
| Percent Difference from Standard |  | 120.2% | 215.4% | 236.5% | 275.5% | 254.9% |

*See Tables 4 and 20 above for formulations corresponding to numeric designations Testing Results:

Testing shows that defoamer, 265-54-2, containing the DIOA diluted polymer from Example 1 above provided a 120% increase in performance over the oil base standard. With an 8 mol % addition of acrylic acid to polymer, 265-66-2, there is an unexpected increase of 275.5% in performance over traditional oil based defoamers.

Acrylic Acid Polymer at Different Concentrations:

The 8 mol % acrylic acid polymer was tested against Acrylate polymer in DIDP and Acrylate polymer in DIOA in an oil based defoamer formulation at 3, 6, and 10%. Below are the formulations and results from the testing.

TABLE 27

Oil Based Formulations

| Generic Oil Base: | | |
|---|---|---|
| EBS | 2% | |
| Hydrophobic Silica | 2% | |
| Paraffinic Oil | 96% | |

Products Tested:

|  | 265-94-2 | 265-94-3 | 265-94-4 | 265-94-5 | 265-94-6 | 265-94-7 | 265-94-8 | 265-94-9 | 265-94-10 |
|---|---|---|---|---|---|---|---|---|---|
| Generic Oil Base | 97% | 97% | 97% | 94% | 94% | 94% | 90% | 90% | 90% |
| Acrylate Polymer in DIDP | 3% |  |  | 6% |  |  | 10% |  |  |
| Acrylate Polymer in DIOA |  | 3% |  |  | 6% |  |  | 10% |  |
| 8 Mol % Acrylic Acid |  |  | 3% |  |  | 6% |  |  | 10% |

TABLE 28

Results from Oil Based Defoamer Testing with 3% Polymer

| 3% Polymer | 265-94-2 | 265-94-3 | 265-94-4 |
|---|---|---|---|
| 1st 30 Seconds Area | 12.0 | 12.1 | 10.7 |
| Total Runtime Area | 49.5 | 50.8 | 44.6 |
| Percent Difference from Standard |  | 2.6% | −10.0% |

Testing Results:

Testing shows that the acrylic acid containing polymer, 265-94-4, does not perform as well as the Acrylate polymer in DIDP or the Acrylate polymer in DIOA at 3% concentration.

TABLE 29

Results from Oil Based Defoamer Testing with 6% Polymer

| 6% Polymer | 265-94-5 | 265-94-6 | 265-94-7 |
|---|---|---|---|
| 1st 30 Seconds Area | 10.6 | 11.1 | 10.5 |
| Total Runtime Area | 43.8 | 44.1 | 46.1 |
| Percent Difference from Standard |  | 0.7% | 5.2% |

Testing Results:

Testing shows that the use of acrylic acid containing polymer, 265-94-7, increases performance when added at 6%, but the increase is within experimental error.

TABLE 30

Results from Oil Based Defoamer Testing with 10% Polymer

| 10% Polymer | 265-94-8 | 265-94-9 | 265-94-10 |
|---|---|---|---|
| 1st 30 Seconds Area | 10.8 | 10.8 | 10.4 |
| Total Runtime Area | 40.9 | 40.1 | 53.5 |
| Percent Difference from Standard | | −1.9% | 31.0% |

Testing Results:

Testing shows that a 10% addition of acrylic acid containing polymer, 265-94-10, in an oil based defoamer increases performance 31% over the Acrylate polymer in DIDP, and 29% over the Acrylate polymer in DIOA.

Dosage Needed to Match the Performance of the Defoamers of the Present Invention Tests were completed to determine the dosage of the oil based defoamer that was needed in order to match the performance of the polymeric containing defoamers of the present invention. Below are the results from that testing.

TABLE 31

Results Showing the Amount of Oil Based Defoamer Needed to Match Polymeric Performance

| | Oil Base Defoamer 200 µL | 265-54-2 Acrylate Polymer in DIOA 200 µL | 265-66-2 8 Mol % 200 µL | Oil Base Defoamer 1000 µL |
|---|---|---|---|---|
| 1st 30 Seconds Area | 12.1 | 10.5 | 10.7 | 14.1 |
| Total Runtime Area | 21.8 | 76.2 | 82.4 | 83.9 |
| Percent Difference from Standard | | 249.9% | 278.3% | 285.1% |

Testing Results:

Results show that 1000 µL, of oil based defoamer was needed to match the performance of polymeric defoamer, 265-66-2, containing the acrylate/acrylic acid polymer. This represents a five-fold increase in defoamer dosage over the experimental polymeric defoamers.

Example 8

Silicone Emulsion Defoamer Testing

The different polymers were tested in a silicone emulsion in an attempt to measure the affect of the polymer on performance. Below are the formulations and results from the testing.

TABLE 32

Silicone Emulsion Formulations*

| | 265-95-1 | 265-95-2 | 265-95-3 | 265-96-1 | 265-96-2 | 265-96-3 |
|---|---|---|---|---|---|---|
| Silicone Emulsion | 99 | 99 | 99 | 98 | 98 | 98 |
| Acrylate Polymer in DIDP | 1 | | | 2 | | |
| Acrylate Polymer in DIOA | | 1 | | | 2 | |
| 8 Mol % Acrylic Acid | | | 1 | | | 2 |

*Polymers were added into the formulation during product manufacture, not as a post-add.

TABLE 33

Results from Silicone Emulsion Testing

| | 265-95-1 1% Acrylate Polymer in DIDP Avg | 265-95-2 1% Acrylate Polymer in DIOA Avg | 265-95-3 1% 8 Mol % Avg | 265-96-1 2% Acrylate Polymer in DIDP Avg | 265-96-2 2% Acrylate Polymer in DIOA Avg | 265-96-3 2% 8 Mol % Avg |
|---|---|---|---|---|---|---|
| 1st 30 Seconds Area | 8.6 | 9.1 | 8.1 | 8.8 | 7.2 | 8.3 |
| Total Runtime Area | 36.6 | 41.2 | 27.6 | 37.8 | 22.2 | 20.3 |
| Percent Difference from Standard | | 12.4% | −24.7% | 3.1% | −39.5% | −44.6% |

Testing Results:

Testing shows that increasing the amount of polymer in the silicone emulsion formulation decreases performance with polymer, 265-96-3, containing 8 mol % acrylic acid having the poorest performance.

Silicone Concentrate Testing:

The different polymers were examined in a silicone concentrate defoamer at 3, 6, and 10%. Below are the formulations and results from the testing.

TABLE 34

Silicone Concentrate Defoamer Formulations

| | 265-97-2 | 265-97-3 | 265-97-4 | 265-97-5 | 265-97-6 | 265-97-7 | 265-97-8 | 265-97-9 | 265-97-10 |
|---|---|---|---|---|---|---|---|---|---|
| Generic Silicone Defoamer Base: | 97 | 97 | 97 | 94 | 94 | 94 | 90 | 90 | 90 |
| Acrylate Polymer in DIDP | 3 | | | 6 | | | 10 | | |
| Acrylate Polymer in DIOA | | 3 | | | 6 | | | 10 | |
| 8 Mol % Acrylic Acid | | | 3 | | | 6 | | | 10 |

*Polymer was post-added to the silicone defoamer and mixed for 10 minutes.

TABLE 35

Results from Silicone Concentrate Testing

Table 35A

| | 265-97-2 3% Acrylate Polymer in DIDP | 265-97-3 3% Acrylate Polymer in DIOA | 265-97-4 3% 8 Mol % | 265-97-5 6% Acrylate Polymer in DIDP |
|---|---|---|---|---|
| 1st 30 Seconds Area | 9.3 | 8.9 | 8.7 | 9.9 |
| Total Runtime Area | 27.4 | 25.5 | 17.3 | 29.6 |
| Percent Difference from Standard | | −0.1 | −0.4 | 0.1 |

Table 35B

| | 265-97-6 6% Acrylate Polymer in DIOA | 265-97-7 6% 8 Mol % | 265-97-8 10% Acrylate Polymer in DIDP | 265-97-9 10% Acrylate Polymer in DIOA | 265-97-10 10% 8 Mol % |
|---|---|---|---|---|---|
| 1st 30 Seconds Area | 9.5 | 10.2 | 8.5 | 8.5 | 9.9 |
| Total Runtime Area | 24.6 | 18.3 | 21.0 | 17.2 | 15.1 |
| Percent Difference from Standard | −0.1 | −0.3 | −0.2 | −0.4 | −0.4 |

Testing Results:

Testing shows that varying the polymers in different silicone defoamer concentrations have no effect on performance.

Example 9

Methacrylic Acid Addition

Reactions were completed where the acrylic acid was replaced with methacrylic acid. The procedure for manufacturing the polymer was the same as with the acrylic acid (see Example 6 above). The methacrylic acid was added to the Acrylate polymer at 8 mol %. The resulting polymer has the numerical designation 296-4. The polymer was clear, with a viscosity of 27,750 cps as measured by a Brookfield RVT viscometer, spindle 6, speed 60. The methacrylic acid polymer was then tested in the polymeric defoamer formulation as a direct substitution. Below are the formulations tested and the results from the testing.

TABLE 36

Polymeric Formulations Containing 23.5% Polymer

| | 265-100-4 | 265-100-5 | 265-100-6 | 296-6 |
|---|---|---|---|---|
| Polypropylene Glycol | 31.5 | 31.5 | 31.5 | 31.5 |
| 10% Hydrophobic Silica in Polypropylene Glycol | 30 | 30 | 30 | 30 |
| Polyether-Modified Polysiloxane Silicone Surfactant | 10 | 10 | 10 | 10 |
| Alkyl Modified Siloxane Silicone Wax | 5 | 5 | 5 | 5 |
| Acrylate Polymer in DIDP | 23.5 | | | |
| Acrylate Polymer in DIOA | | 23.5 | | |
| 8 Mol % Acrylic Acid | | | 23.5 | |
| 8 Mol % Methacrylic Acid | | | | 23.5 |

TABLE 37

Results from Polymeric Defoamer Testing

|  | 265-100-4 Acrylate Polymer in DIDP Avg | 265-100-5 Acrylate Polymer in DIOA Avg | 265-100-6 8 Mol % Acrylic Avg | 296-6 8 Mol % Methacrylic Avg |
|---|---|---|---|---|
| 1st 30 Seconds Area | 4.2 | 4.3 | 5.3 | 6.0 |
| Total Runtime Area | 25.5 | 28.8 | 32.5 | 34.4 |
| Percent Difference from Standard |  | 12.9% | 27.6% | 34.9% |

Testing Results:

Testing of the polymeric defoamers containing 23.5% polymer shows the addition of polymer 296-6, containing 8 mol % methacrylic acid, increases performance when compared to the use of the Acrylate polymer in DIDP, the Acrylate polymer in DIOA, or the polymer containing 8 mol % acrylic acid.

Example 10

Preparation of Methacrylate Polymers

After showing that substitution of methacrylic acid for acrylic acid in the acrylate polymer leads to an increase in defoamer performance, experiments were completed that replaces all of the acrylate monomers with the methacrylate analogs, as well as the acrylic acid with methacrylic acid. The methods and procedures of Example 1 were used to produce the polymers.

In the first experiment, 250 g of DIOA was placed into a reaction flask. A vacuum was applied for 20 minutes to remove dissolved air. The DIOA was sparged with nitrogen while being heated to 79-82° C. with mixing. Once at temperature and with the nitrogen sparge and constant mixing, 1.5 g of a free radical generating compound was added and allowed to dissolve over a 5 minute period. Meanwhile, 33.22 g of 2-hydroxyethyl methacrylate, 153.22 g of 2-ethylhexyl methacrylate, and 13.56 g of methacrylic acid were pre-mixed in a beaker. The mixture was added to the DIOA diluent through an addition funnel at a rate of approximately 1.0 g/minute, making sure to maintain a temperature of approximately 79-82° C. After 25 minutes, the mixture began to cloud. After 1.5 hours, the mixture in the reaction flask was viscous enough to overload the mixer. The mixer was replaced, but the mixture was too thick to stir. The heat was turned off. 42.2 g of the monomer mixture was present in the addition tube, leading to 157.8 g of monomer mixture in the reaction flask. The resulting polymer was allowed to cool. The polymer was solid at room temperature.

A second experiment was completed with a more dilute monomer concentration to allow for the reaction to run to completion while still being able to mix the resultant polymer. Again, the methods and procedures of Example 1 were used to produce the polymers.

250 g of DIOA was placed into a reaction flask. A vacuum was applied for 20 minutes to remove dissolved air. The DIOA was sparged with nitrogen while being heated to 79-82° C. with mixing. Once at temperature and with the nitrogen sparge and constant mixing, 1.5 g of a free radical generating compound was added and allowed to dissolve over a 5 minute period. Meanwhile, 8.79 g of 2-hydroxyethyl methacrylate, 40.56 g of 2-ethylhexyl methacrylate, and 3.59 g of methacrylic acid were pre-mixed in a beaker. The mixture was added to the DIOA diluent through an addition funnel at a rate of approximately 1.0 g/minute, making sure to maintain a temperature of approximately 79-82° C. After the monomer mixture was added, the addition funnel and tube was rinsed with 48 g of DIOA, and then 0.5 g of free radical generating compound was added. Another 0.5 g of free radical generating compound was added, and the mixture was held at 79-82° C. with mixing and nitrogen for 2 hours. The mixture was then air cooled to room temperature. The resulting polymer was a cloudy liquid with a viscosity of 400 cps. The numeric designation for this product is 296-14.

Performance testing of polymer, 296-14, was completed against formulations 296-15-1,2,4, and 5, shown below in Table 38. The polymers were formulated into polymeric defoamers, and the defoamers were tested in 100% black liquor at 82° C. Below are the formulations and results from the testing.

TABLE 38

Polymeric Defoamer Formulations

|  | 296-15-1 | 296-15-2 | 296-15-3 | 296-15-4 | 296-15-5 |
|---|---|---|---|---|---|
| Polypropylene Glycol | 25 | 25 | 25 | 25 | 25 |
| 10% Hydrophobic Silica in Polypropylene Glycol | 30 | 30 | 30 | 30 | 30 |
| Acrylate Polymer in DIDP | 11.3 |  |  |  |  |
| Acrylate Polymer in DIOA |  | 11.3 |  |  |  |
| 296-14 |  |  | 30 |  |  |
| 8 Mol % Acrylic |  |  |  | 11.3 |  |
| 8 Mol % Methacrylic |  |  |  |  | 11.3 |
| Polyether-Modified Polysiloxane Silicone Surfactant | 10 | 10 | 10 | 10 | 10 |
| Alkyl Modified Siloxane Silicone Wax | 5 | 5 | 5 | 5 | 5 |
| DIOA | 18.8 | 18.8 |  | 18.8 | 18.8 |

TABLE 39

Results from Testing the Methacrylate/Methacrylic Acid Polymer.

|  | 296-15-1 Acrylate Polymer in DIDP | 296-15-2 Acrylate Polymer in DIOA | 296-15-3 Methacrylate/ Methacrylic Acid Polymer |
|---|---|---|---|
| 1st 30 Seconds Area | 5.9 | 5.7 | 6.9 |
| Total Runtime Area | 31.7 | 31.2 | 46.9 |
| Percent Difference from Standard |  | −1.5% | 48.1% |

Testing Results:

Testing shows that a polymer comprising hydroxyalkyl methacrylate, alkyl methacrylate, and methacrylic acid, when formulated into defoamer 296-15-3, provides increased initial air removal and increased longevity when compared to polymers 296-15-1 and 2, consisting of hydroxyalkyl acrylate and alkyl acrylate. A defoamer formulation containing the above polymer, 296-14, outperforms defoamer formulations 296-15-1 and 2 by as much as 48%.

SUMMARY AND CONCLUSIONS

The potential benefits of a defoamer that contains an alkyl acrylate/hydroxyalkyl acrylate/acrylic acid polymer are clearly demonstrated herein. Notable improvements in initial performance and longevity were realized by incorporating the polymer into a formulation containing polypropylene glycol, hydrophobic silica, and silicone surfactants. This approach is new in terms of defoamers used in industrial settings.

The use of monomers other than alkyl acrylate/hydroxyalkyl acrylate/acrylic acid that may be used to produce a polymer that provides increased defoaming performance has been demonstrated herein. The alternate monomers may include methacrylic acid, 2-ethylhexyl methacrylate, 2-hydroxyethyl methacrylate, and the butyl analogs of the acrylates and methacrylates.

The final formulations for use will be determined based on the operating parameters of a given application, i.e. the alkalinity, temperature, and the need for dispersibility. The final product(s) will be tailored for individual needs.

All patents, patent applications and publications cited in this application are hereby incorporated by reference in their entirety for all purposes to the same extent as if each individual patent, patent application or publication were so individually denoted.

Although certain embodiments and examples have been described in detail above, those having ordinary skill in the art will clearly understand that many modifications are possible in the embodiments and examples without departing from the teachings thereof. All such modifications are intended to be encompassed within the below claims of the invention.

What is claimed is:

1. A defoamer formulation comprising 0.01 to 50% by weight of an acrylate polymer with 1-20 mol % acrylic acid in a suitable diluent, based on a total weight of the formulation, 20-80% by weight of an organic carrier that consists of polypropylene glycol, based on a total weight of the formulation, 0.01 to 15% by weight of an additive, based on a total weight of the formulation, and optionally, 0.01 to 30% by weight of a surfactant, based on a total weight of the formulation.

2. The defoamer formulation of claim 1, wherein the acrylate polymer comprises acrylate monomers of the following general formula:

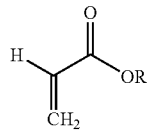

R is hydrogen or a linear or a branched alkyl group comprising from about 1 to 18 carbon atoms and optionally at least one hydroxy group.

3. The defoamer formulation of claim 2, wherein the acrylate polymer is a product of a polymerization reaction between 2-ethylhexyl acrylate monomer, 2-hydroxyethyl acrylate monomer, and acrylic acid monomer.

4. The defoamer formulation of claim 1, comprising 20-30% by weight hydroxyalkyl/alkyl acrylate polymer with 8 mol % acrylic acid monomer, based on a total weight of the formulation.

5. The defoamer formulation of claim 1, wherein the suitable diluent is selected from diisodecyl phthalate, diisooctyl adipate, bis-2-ethylhexyl adipate, dioctyl adipate, 2-ethyl-1-hexanol, isooctyl alcohol, dihexyl phthalate, or mixtures thereof.

6. The defoamer formulation of claim 5, wherein the suitable diluent is diisoctyl adipate.

7. The defoamer formulation of claim 1, comprising 40-60% by weight of an organic carrier that consists of polypropylene glycol, based on a total weight of the formulation.

8. The defoamer formulation of claim 1, comprising 3-10% by weight of an additive, based on a total weight of the formulation.

9. The defoamer formulation of claim 1, wherein the additive is selected from hydrophobic silica, waxes, fatty alcohols, fatty acids, or mixtures thereof.

10. The defoamer formulation of claim 9, wherein the additive is hydrophobic silica.

11. The defoamer formulation of claim 1, comprising 10-15% by weight surfactants, based on a total weight of the formulation.

12. The defoamer formulation of claim 1, wherein the surfactant is selected from polyethylene glycol, polypropylene glycol, polypropylene triol, butoxy polypropylene polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, or mixtures thereof.

13. The defoamer formulation of claim 12, wherein the surfactant is a siloxane wax.

14. The defoamer formulation of claim 1, comprising 23.5% by weight acrylate polymer with 8 mol % acrylic acid in diisooctyl adipate, based on a total weight of the formulation, 51.5% by weight polypropylene glycol, based on a total weight of the formulation, 10% by weight hydrophobic silica, based on a total weight of the formulation, and 15% by weight siloxane wax, based on a total weight of the formulation.

15. A defoamer formulation comprising 0.01 to 50% by weight of a methacrylate polymer with 1-20 mol % methacrylic acid in a suitable diluent, based on a total weight of the formulation, 20-80% by weight of an organic carrier that consists of polypropylene glycol, based on a total weight of the formulation, 0.01 to 15% by weight of an additive, based on a total weight of the formulation, and optionally, 0.01 to 30% by weight of a surfactant, based on a total weight of the formulation.

16. The defoamer formulation of claim 15, wherein the methacrylate polymer comprises methacrylate monomers of the following general formula:

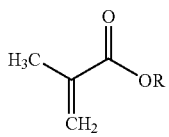

R is hydrogen or a linear or a branched alkyl group comprising from about 1 to 18 carbon atoms and optionally at least one hydroxy group.

17. The defoamer formulation of claim 16, wherein the methacrylate polymer is a product of a polymerization reaction between 2-ethylhexyl methacrylate monomer, 2-hydroxyethyl methacrylate monomer, and methacrylic acid monomer.

18. The defoamer formulation of claim 15, comprising 20-30% by weight hydroxyalkyl/alkyl methacrylate polymer with 8 mol % methacrylic acid monomer, based on a total weight of the formulation.

19. The defoamer formulation of claim 15, wherein the suitable diluent is selected from diisodecyl phthalate, diisooctyl adipate, bis-2-ethylhexyl adipate, dioctyl adipate, 2-ethyl-1-hexanol, isooctyl alcohol, dihexyl phthalate, or mixtures thereof.

20. The defoamer formulation of claim 19, wherein the suitable diluent is diisooctyl adipate.

21. The defoamer formulation of claim 15, comprising 40-60% by weight of an organic carrier that consists of polypropylene glycol, based on a total weight of the formulation.

22. The defoamer formulation of claim 15, comprising 3-10% by weight of an additive, based on a total weight of the formulation.

23. The defoamer formulation of claim 15, wherein the additive is selected from hydrophobic silica, waxes, fatty alcohols, fatty acids, or mixtures thereof.

24. The defoamer formulation of claim 23, wherein the additive is hydrophobic silica.

25. The defoamer formulation of claim 15, comprising 10-15% by weight surfactants, based on a total weight of the formulation.

26. The defoamer formulation of claim 15, wherein the surfactant is selected from polyethylene glycol, polypropylene glycol, polypropylene triol, butoxy polypropylene polyethylene glycol,alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, or mixtures thereof.

27. The defoamer formulation of claim 26, wherein the surfactant is a siloxane wax.

28. The defoamer formulation of claim 15, comprising 30% by weight methacrylate polymer with 8 mol % methacrylic acid, based on a total weight of the formulation, 45% by weight polypropylene glycol, based on a total weight of the formulation, 10% by weight hydrophobic silica, based on a total weight of the formulation, and 15% by weight siloxane wax, based on a total weight of the formulation.

29. A method of reducing or preventing the generation of foam, comprising adding the defoamer formulation of claim 1 before, during, or after said foam is generated.

30. A method of reducing or preventing the generation of foam, comprising adding the defoamer formulation of claim 15 before, during, or after said foam is generated.

31. A method for preparing the defoamer formulation of claim 1 comprising mixing 0.01 to 50% by weight of an acrylate polymer with 1-20 mol % acrylic acid in a suitable diluent, based on a total weight of the formulation, 20-80% by weight of an organic carrier that consists of polypropylene glycol, based on a total weight of the formulation, 0.01 to 15% by weight of an additive, based on a total weight of the formulation, and optionally, 0.01 to 30% by weight of a surfactant, based on a total weight of the formulation.

32. A method for preparing the defoamer formulation of claim 15 comprising mixing 0.01 to 50% by weight of a methacrylate polymer with 1-20 mol % methacrylic acid in a suitable diluent, based on a total weight of the formulation, 20-80% by weight of an organic carrier that consists of polypropylene glycol, based on a total weight of the formulation, 0.01 to 15% by weight of an additive, based on a total weight of the formulation, and optionally, 0.01 to 30% by weight of a surfactant, based on a total weight of the formulation.

* * * * *